United States Patent
Hirano et al.

(10) Patent No.: US 10,668,459 B2
(45) Date of Patent: Jun. 2, 2020

(54) EXHAUST GAS PURIFICATION CATALYST (71) Applicant: CATALER CORPORATION, Shizuoka (JP)

(72) Inventors: Shusuke Hirano, Shizuoka (JP); Makoto Tsuji, Shizuoka (JP); Yoshinori Yamashita, Shizuoka (JP)

(73) Assignee: Cataler Corporation, Shizuoka (JP)

( * ) Notice: Subject to any disclaimer, the term of this patent is extended or adjusted under 35 U.S.C. 154(b) by 296 days.

(21) Appl. No.: 15/515,828

(22) PCT Filed: Oct. 2, 2015

(86) PCT No.: PCT/JP2015/078070
§ 371 (c)(1),
(2) Date: Mar. 30, 2017

(87) PCT Pub. No.: WO2016/052735
PCT Pub. Date: Apr. 7, 2016

(65) Prior Publication Data
US 2017/0297011 A1    Oct. 19, 2017

(30) Foreign Application Priority Data
Oct. 2, 2014  (JP) .................... 2014-204287

(51) Int. Cl.
*B01J 35/10*    (2006.01)
*B01J 23/42*    (2006.01)
(Continued)

(52) U.S. Cl.
CPC .......... *B01J 35/1052* (2013.01); *B01D 53/94* (2013.01); *B01J 23/42* (2013.01); *B01J 23/44* (2013.01);
(Continued)

(58) Field of Classification Search
None
See application file for complete search history.

(56) References Cited

U.S. PATENT DOCUMENTS

| 5,397,758 A | * | 3/1995 | Bouruetaubertot .. | B01D 53/945 502/303 |
| 5,538,697 A | * | 7/1996 | Abe ..................... | B01D 53/945 422/169 |

(Continued)

FOREIGN PATENT DOCUMENTS

| JP | 2001-170500 | 6/2001 |
| JP | 2006-26485 | 2/2006 |

(Continued)

*Primary Examiner* — Amber R Orlando
(74) *Attorney, Agent, or Firm* — Occhiuti & Rohlicek LLP (57) ABSTRACT

An exhaust gas purification catalyst is provided for which a purification performance is excellent and particle growth of a catalyst metal is suppressed. The exhaust gas purification catalyst is provided with a substrate and a catalyst layer formed on the substrate. The catalyst layer contains a catalyst metal that functions as an oxidation and/or reduction catalyst and contains a support that supports the catalyst metal. The support is constituted of a porous ceramic that, in its volumetric pore diameter distribution measured based on a nitrogen gas adsorption method, has a pore diameter $P_{10}$ corresponding to a cumulative 10% from a small pore side and a pore diameter $P_{90}$ corresponding to a cumulative 90% from the small pore side that are both in a range from 5 to 50 nm.

7 Claims, 3 Drawing Sheets

(51) Int. Cl.
  *B01J 23/44*   (2006.01)
  *B01D 53/94*   (2006.01)
  *B01J 23/63*   (2006.01)
  *F01N 3/02*    (2006.01)
  *F01N 3/022*   (2006.01)

(52) U.S. Cl.
  CPC .............. *B01J 23/63* (2013.01); *B01J 35/10* (2013.01); *B01J 35/1004* (2013.01); *F01N 3/0222* (2013.01); *F01N 2330/06* (2013.01)

(56) References Cited

U.S. PATENT DOCUMENTS

| | | | |
|---|---|---|---|
| 5,710,088 A | 1/1998 | Jen et al. | |
| 6,171,573 B1* | 1/2001 | Sato | B01J 13/00 |
| | | | 423/626 |
| 6,306,360 B1* | 10/2001 | Yamamoto | B01J 21/005 |
| | | | 423/600 |
| 6,419,889 B1* | 7/2002 | Boxhoorn | B01D 53/8628 |
| | | | 423/239.1 |
| 7,186,757 B2* | 3/2007 | Espinoza | B01J 21/12 |
| | | | 518/700 |
| 9,737,883 B2* | 8/2017 | Yamane | B01J 27/19 |
| 2002/0049137 A1* | 4/2002 | Morikawa | B01D 53/945 |
| | | | 502/351 |
| 2003/0185736 A1 | 10/2003 | Hatanaka et al. | |
| 2005/0107479 A1* | 5/2005 | Espinoza | B01J 21/12 |
| | | | 518/718 |
| 2006/0183636 A1* | 8/2006 | Klein | B01D 53/944 |
| | | | 502/261 |
| 2011/0165045 A1 | 7/2011 | Ikeda et al. | |
| 2011/0318249 A1* | 12/2011 | Nakayama | C01B 37/00 |
| | | | 423/325 |
| 2012/0122670 A1 | 5/2012 | Polli et al. | |
| 2013/0324392 A1 | 12/2013 | Hasegawa et al. | |
| 2014/0271427 A1* | 9/2014 | Hoke | B01J 23/63 |
| | | | 423/213.5 |
| 2015/0209760 A1* | 7/2015 | Asanuma | B01J 23/63 |
| | | | 502/304 |
| 2018/0208527 A1* | 7/2018 | Khokhar | B01J 37/0201 |

FOREIGN PATENT DOCUMENTS

| | | |
|---|---|---|
| JP | 2007-152286 | 6/2007 |
| JP | WO2010/103856 | 9/2010 |
| JP | 2013-107055 | 6/2013 |

* cited by examiner

EXHAUST GAS PURIFICATION CATALYST

CROSS REFERENCE TO RELATED APPLICATIONS

This application is a National Stage of International Application No. PCT/JP2015/078070 filed on Oct. 2, 2015, which claims priority to Japanese Application No. 2014-204287 filed on Oct. 2, 2014, the contents of which are hereby incorporated by reference in their entirety.

TECHNICAL FIELD

The present invention relates to an exhaust gas purification catalyst that is disposed in an exhaust system of an internal combustion engine. More particularly, the present invention relates to an exhaust as purification catalyst that has a controlled pore diameter distribution in its support.

This international application claims priority based on Japanese Patent Application 2014-204287 filed Oct. 2, 2014, and the contents of said application are incorporated in their entirety in this Description by reference.

BACKGROUND ART

The exhaust gas discharged from internal combustion engines, e.g., automobile engines, contains harmful components such as hydrocarbons (HC), carbon monoxide (CO), and nitrogen oxides ($NO_x$). Exhaust gas purification catalysts are widely used in order to efficiently remove these exhaust gas components. Exhaust gas purification catalysts are typically provided with a catalyst layer that contains a precious metal that functions as a catalyst (also simply referred to as a "catalyst metal" herebelow) and with a support that supports this catalyst metal.

A problem with these exhaust gas purification catalysts is that the catalyst metal deteriorates, for example, under long-term exposure to high-temperature exhaust gas, and the purification performance then declines. A primary cause of this is the sintering (particle growth due to sintering) of the catalyst metal under high-temperature conditions (for example, 800° C. to 1000° C.). That is, when sintering of the catalyst metal advances, the specific surface area declines and fewer catalytically active sites are present. The exhaust gas purification performance may decline as a result. Various investigations have thus already been carried out in order to inhibit this phenomenon. For example, Patent Literature 1 teaches that particle growth by the catalyst metal can be inhibited by using, as the support, alumina that has an average interlayer distance controlled to 0.01 to 0.1 μm.

CITATION LIST

Patent Literature

Patent Literature 1: Japanese Patent Application Laid-open No. 2007-152286

SUMMARY OF INVENTION

However, investigations by the present inventors confirmed that there was still room for improvement in the art in Patent Literature 1. Specifically, a desired purification performance was not obtained due to an inability to adequately inhibit particle growth (aggregation) of the catalyst metal depending on the operating conditions for the internal combustion engine and the type of gas to be purified.

The present invention was created in order to solve this problem, and an object of the present invention is to provide an exhaust gas purification catalyst that exhibits a high purification performance and a better suppression of catalyst metal particle growth.

The present inventors carried out extensive and intensive investigations in order to achieve this object. They discovered as a result that controlling the pore diameter distribution of the support is effective for suppressing catalyst metal particle growth.

The exhaust gas purification catalyst according to the present invention is disposed in an exhaust pipe of an internal combustion engine, e.g., an automobile engine, and that performs purification of the exhaust gas discharged from the internal combustion engine. This exhaust gas purification catalyst is provided with a substrate and a catalyst layer formed on the substrate wherein the catalyst layer contains a catalyst metal that functions as an oxidation and/or reduction catalyst and a support that supports the catalyst metal. This support is constituted of a porous ceramic for which, in its volumetric pore diameter distribution measured based on a nitrogen gas adsorption method, a pore diameter $P_{10}$ corresponding to a cumulative 10% from a small pore side and a pore diameter $P_{90}$ corresponding to a cumulative 90% from the small pore side are both in a range from 5 to 50 nm.

The pore diameters in the support can be made more uniform than heretofore by having the pore diameter $P_{10}$ and the pore diameter $P_{90}$ both be in the indicated range. A highly dispersed loading by the catalyst metal can be achieved as a consequence. In addition, catalyst metal migration can be restrained to a greater degree than heretofore; for example, catalyst metal particle growth and alloying can be suppressed even under high-temperature conditions (for example, 800° C. to 1000° C.). As a result, for the use of about the same amount of catalyst metal as in conventional products, a relatively improved purification performance and heat resistance can be achieved. Therefore, a longer life for the exhaust gas purification catalyst can be realized. Moreover, a purification performance equal to or better than for conventional products can be consistently realized even when the amount of catalyst metal used is reduced from that heretofore. This is also very significant from the standpoint of energy savings and cost reduction.

The "pore diameter distribution" in this Description refers to the volumetric pore diameter distribution obtained using the Barrett-Joyner-fialenda (BJH) method to analyze the adsorption isotherms measured by gas adsorption using nitrogen gas.

The pore diameter $P_{10}$ can be 5 to 20 nm. As a result of this, little structural modification occurs even under high-temperature conditions and a support having an excellent heat resistance can be realized. The effects of the present invention can then be realized at even higher levels.

In addition, the pore diameter $P_{90}$ can be 20 to 50 nm. By keeping $P_{90}$ in this range, the dispersibility of the catalyst metal can be improved and reductions in the catalytic performance under high-temperature conditions can be inhibited. The effects of the present invention can then be realized at even higher levels.

In a preferred aspect of the exhaust gas purification catalyst disclosed herein, a ratio of the pore diameter $P_{10}$ to the pore diameter $P_{90}$ ($P_{10}/P_{90}$) is at least 0.25 and not more than 0.6.

The pore diameter distribution becomes narrower (sharpens) as the ratio $P_{10}/P_{90}$ approaches 1, while conversely the pore diameter distribution becomes wider (broadens) as the ratio $P_{10}/P_{90}$ approaches 0. That is, the ratio $P_{10}/P_{90}$ is an indicator of the breadth of the pore diameter distribution. The ratio $P_{10}/P_{90}$ of at least 0.25 indicates a more uniform pore diameter. This can bring about a more uniform dispersion of the catalyst metal. As a result, the sintering accompanying catalyst metal particle growth can be better suppressed. In addition, the ratio $P_{10}/P_{90}$ for the ceramic of not more than 0.6 means that the pore diameters have greater width. This can bring about balance at higher levels between reducing the pressure loss and suppressing sintering. It is also preferred from the standpoint of increasing the productivity and improving the yield.

In another preferred aspect of the exhaust gas purification catalyst disclosed herein, a proportion in the porous ceramic for a pore volume at 100 nm and above is not more than 5% of a total pore volume. This makes it possible to achieve a high degree of inhibition of catalyst metal particle growth. Accordingly, reductions in catalytic activity due to aggregation and alloying of the catalyst metal can be even more thoroughly suppressed.

In another preferred aspect of the exhaust gas purification catalyst disclosed herein, the total pore volume of the porous ceramic is at least 0.2 mL/g. This makes it possible to improve the dispersibility of the catalyst metal and even more thoroughly suppress catalyst metal particle growth under high-temperature conditions. In addition, the diffusibility of the exhaust gas can be improved and, for example, the pressure loss can also be reduced.

In another preferred aspect of the exhaust gas purification catalyst disclosed herein, a proportion of the catalyst metal is 0.1 to 3 mass % with respect to a total mass of the catalyst metal. In a more preferred aspect, the proportion of the catalyst metal is 0.3 to 1 mass % with respect to the total mass of the catalyst metal.

The catalyst metals (particularly the precious metals belonging to the platinum group) are valuable as resources and their prices have soared in recent years. As a consequence it is desirable in terms of energy savings and cost reduction to lower their amount of use. The invention disclosed herein can enhance the catalytic activity relative to the amount of catalyst metal loaded, and as a consequence an excellent exhaust gas purification performance can be realized even when the amount of use of the catalyst metal is reduced to the range indicated above.

DESCRIPTION OF EMBODIMENTS

Preferred embodiments of the present invention are described in the following with reference to the figures as appropriate. In the figures below, members and positions that exercise the same function are assigned the same reference sign and duplicate descriptions are either omitted or simplified. The dimensional relationships (length, width, thickness, and so forth) in the individual figures do not necessarily reflect actual dimensional relationships. Moreover, in addition to those matters that are particularly described in this Description (for example, the pore diameter of the support), those matters required for the execution of the present invention but not particularly described in this Description (for example, general methods for producing exhaust gas purification catalysts) can be understood as design matters for a person skilled in the art based on the conventional art in the pertinent field. The present invention can be executed based on the contents disclosed in this Description and the common general technical knowledge in the pertinent field.

The exhaust gas purification catalyst disclosed herein is characterized by a high degree of control of a pore diameter distribution of the support contained in the catalyst layer. There are thus no particular limitations on the other structures. The exhaust gas purification catalyst of the present invention can be provided, for example, by suitably selecting the substrate, support, and a catalyst metal, vide infra, and molding into a desired shape in accordance with the application.

Figure 1:
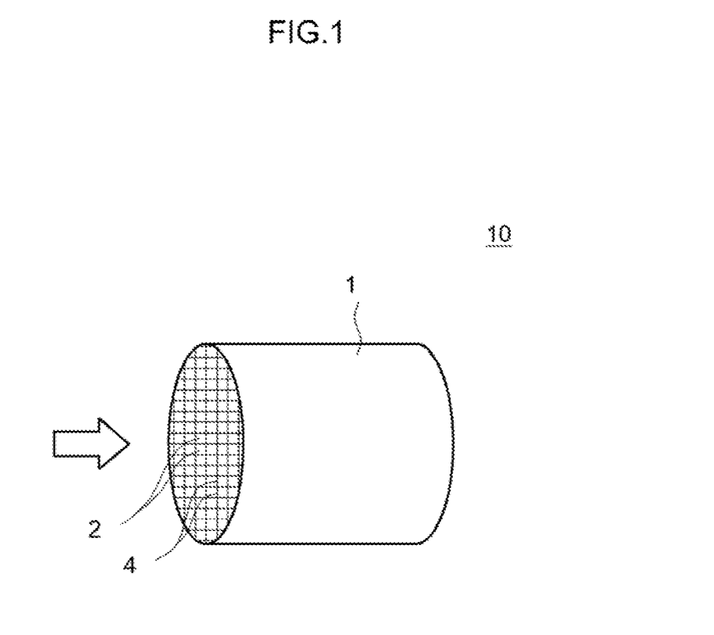
FIG. 1 is a perspective diagram that schematically shows an exhaust gas purification catalyst according to an embodiment.

FIG. 1 is a schematic diagram of an exhaust gas purification catalyst according to a preferred embodiment. The direction of exhaust gas flow is indicated in this figure by the direction of the arrow. Thus, as one faces FIG. 1, the left side is the upstream side in the exhaust gas flow path (exhaust pipe) and the right side is the downstream side of the exhaust gas flow path.

The exhaust gas purification catalyst 10 shown in FIG. 1 is an exhaust gas purification catalyst that has what is known as a straight-flow configuration. In this embodiment, the exhaust gas purification catalyst 10 is provided with a honeycomb substrate 1 having a cylindrical outer shape. The honeycomb substrate 1 is provided along the direction of its cylinder axis (exhaust gas flow direction) with a plurality of regularly arranged through holes (cells) 2 and with partitions (rib walls) 4 that divide these cells 2. A catalyst layer (not shown in the figure) having prescribed properties (for example, length and thickness) is formed on a rib wall 4.

During the interval in which it flows (passes through) within a flow path (within the cell 2) in the honeycomb substrate 1, the exhaust gas supplied to the exhaust gas purification catalyst 10 comes into contact with the catalyst layer disposed on the rib wall 4. The harmful components in the exhaust gas are thereby purified. For example, HC and CO present in the exhaust gas are oxidized by the catalytic function of the catalyst layer and are thereby converted (purified) into, e.g., water ($H_2O$) and carbon dioxide ($CO_2$). In addition, for example, $NO_x$ is reduced by the catalytic function of the catalyst layer and is thereby converted (purified) into nitrogen ($N_2$). The various constituent features of the exhaust gas purification catalyst 10 are successively described in the following.

<<Substrate>>

The honeycomb substrate 1 constitutes the frame of the exhaust gas purification catalyst. There are no particular limitations on the honeycomb substrate 1, and honeycomb substrates of various materials and as heretofore used in applications of this type can be used here. A honeycomb substrate of a highly heat-resistant material is preferred. For example, the following are advantageously used: ceramics and specifically, for example, aluminum oxide (alumina: $Al_2O_3$), cerium oxide (ceria: $CeO_2$), titanium oxide (titania: $TiO_2$), zirconium oxide (zirconia: $ZrO_2$), and silicon oxide (silica: $SiO_2$); composite oxide ceramics such as cordierite (2MgO.2Al$_2$O$_3$.5SiO$_2$); and carbide ceramics such as silicon carbide (silicon carbide: SiC). Or, this may be made of an alloy such as stainless steel.

A shape of the honeycomb substrate 1 may be the same as that of conventional exhaust gas purification catalysts. For example, a outer shape is a cylindrical shape in the form shown in FIG. 1. Besides a cylindrical shape as in FIG. 1, the outer shape of the honeycomb substrate 1 may also be, for example, an elliptical cylindrical shape or a polygonal cylindrical shape. A capacity of the honeycomb substrate 1 (flow path 2 volume) is not particularly limited, but should generally be at least 0.01 L, for example, at least 0.02 L and preferably at least 0.1 L and, for example, not more than 5 L, preferably not more than 3 L and more preferably not more than 2 L. An overall length in the cylinder axis direction of the honeycomb substrate 1 is not particularly limited, but should generally be about 10 to 500 mm, for example, about 50 to 300 mm. Besides the honeycomb shape shown in FIG. 1, the substrate 1 may also have, for example, a foam shape or a pellet shape.

<<Catalyst Layer>>

The catalyst layer forms, as the site of exhaust gas purification, the primary constituent of the exhaust gas purification catalyst. The catalyst layer is provided with a porous support and a catalyst metal that is loaded on the surface of this support.

The support is an aggregate of porous ceramic powder. The type of ceramic may be the same as for conventional exhaust gas purification catalysts. Among these, the use is preferred of a ceramic that has a large specific surface area (here and below, refers to the specific surface area measured by the nitrogen adsorption method (BET method)) and an excellent heat resistance. Advantageous examples are alumina (Al$_2$O$_3$), ceria (CeO$_2$), titania (TiO$_2$), zirconia (ZrO$_2$), and silica (SiO$_2$) and as well as their solid solutions (for example, ceria-zirconia composite oxide (CZ composite oxide)) and their combinations.

The ceramic powder may be any ceramic powder that satisfies the pore diameter distribution, and, for example, the following can be used: ceramic powder acquired, for example, by the purchase of a commercial product, ceramic powder provided by the processing of a commercial product, and ceramic powder provided by synthesis using a heretofore known method. According to investigations by the present inventors, the pore diameter distribution in the ceramic powder can be controlled, for example, through adjustment of the production conditions for the ceramic powder and the physical and chemical properties of the ceramic powder (for example, an average particle diameter, a specific surface area, and so forth).

In an advantageous example, the average particle diameter of the ceramic powder is made smaller and the specific surface area is made larger by, for example, pulverization, screen (classification), and so forth. By doing this, for example, the ceramic powder is fractured at the parts having a large pore diameter and the pore diameter distribution is then adjusted into the range indicated above. A heretofore known pulverizer can be used for pulverizing, e.g., a ball mill, bead mill, jet mill, planetary mixer, homogenizer, and so forth. Wet pulverizers (vehicle types) are preferably used thereamong. The treatment conditions (for example, output intensity of the treatment apparatus and treatment time) should be selected as appropriate depending on the ceramic powder used. For example, in an embodiment that uses a commercial alumina powder having an average particle size of about 90 µm, the ceramic powder having the pore diameter distribution indicated above can be advantageously obtained using an Attritor (registered trademark) and carrying out treatment for about 1 to 30 minutes (for example, 5 to 15 minutes) at a rotation of about 100 to 200 rpm.

The support in the exhaust gas purification catalyst disclosed herein is constituted of the porous ceramic powder for which, in its volumetric pore diameter distribution measured based on a nitrogen gas adsorption method, a pore diameter $P_{10}$ corresponding to a cumulative 10% from a small pore side and a pore diameter $P_{90}$ corresponding to the cumulative 90% from the small pore side are both in a range from 5 to 50 nm. This makes it possible, for example, to stably obtain a desirable catalytic activity even under high-temperature conditions. The pore diameter distribution of the ceramic powder used as a starting material is maintained even in the catalyst layer post-baking.

The pore diameter $P_{10}$ should be in the range (at least 5 nm) and may be, for example, at least 10 nm and not more than about 20 nm, for example, not more than 15 nm. This makes it possible to better realize a catalyst layer having an excellent mechanical strength (durability).

The average pore diameter $P_{50}$) corresponding to a cumulative 50% from the small pore side should be in the range and typically can be at least 20 nm, for example, at least 25 nm, and not more than about 40 nm, for example, not more than 30 nm. This makes it possible to achieve balance at a high level between reducing pressure losses and suppressing sintering.

The pore diameter $P_{90}$ should be in the range (not more than 50 nm) and may be at least about 20 nm and can typically be at least. 30 nm, for example, at least 34 nm, and can typically be not more than 45 nm, for example, not more than 40 nm.

The pore diameter $P_{95}$ corresponding to the cumulative 95% from the small pore side is not particularly limited, and can be typically at least 35 nm, for example, at least 40 nm, and not more than about 100 nm, for example, not more than 50 nm. In other words, a proportion for the coarse pore volume of equal to and greater than about 100 nm and typically equal to and greater than 50 nm, for example, equal to and greater than 40 nm, can be not more than 5% of a total pore volume. Reducing the proportion of such relatively large pores (for example, macropores) makes it possible for the effects of the present invention to be expressed at still higher levels.

In a preferred embodiment, a ratio of the pore diameter $P_{10}$ to the pore diameter $P_{90}$ ($P_{10}/P_{90}$) is at least about 0.25, for example, at least 0.275 or at least 0.3, and typically not more than 0.6, for example, not more than 0.5. Having the ratio $P_{10}/P_{90}$ be at least the prescribed value indicates that the pore diameter distribution is relatively narrow and that the pore diameter has a prescribed uniformity (evenness). A more uniform catalyst layer can be realized by using such a ceramic powder. Moreover, the sintering accompanying catalyst metal particle growth can be advantageously suppressed.

In addition, having the ratio $P_{10}/P_{90}$ be not more than the prescribed value indicates that the pore diameter distribution is relatively broad and that the pore diameter has a prescribed breadth (scatter). Such a ceramic powder does not require special production equipment and can be prepared relatively simply. This is preferred from the standpoint of improving the productivity and lowering costs. Moreover, a better balance can be achieved between the mechanical strength (durability) of the catalyst layer and suppression of pressure losses.

The properties of the ceramic powder are not particularly limited insofar as the pore diameter distribution is satisfied.

Generally, a specific surface area is larger as the average particle diameter is smaller, and this is effective for increasing an area of contact with the exhaust gas. On the other hand, when the specific surface area of the ceramic powder is too large, there is concern that the structural stability (mechanical strength) and heat resistance of the support that is formed will be inadequate. For these reasons, the specific surface area of the ceramic powder should be generally 50 to 500 m$^2$/g and typically 100 to 400 m$^2$/g, for example, about 100 to 200 m$^2$/g. A pore volume based on a gas adsorption method should generally be 0.2 to 1.0 mL/g, for example, about 0.5 to 0.7 mL/g. In addition, the average particle diameter (volumetric average particle diameter (median diameter) based on measurement of the particle size distribution by laser diffraction/scattering) should generally be 1 to 50 μm, for example, about 5 to 10 μm.

Various metal species that can function as oxidation catalysts and/or reduction catalysts can be considered for the catalyst metal. Typical examples are precious metals from the platinum group, e.g., rhodium (Rh), palladium (Pd), and platinum (Pt). Or, ruthenium (Ru), osmium (Os), iridium (Ir), silver (Ag), and gold (Au) can also be used. Also usable are alloys of two or more selections from these metals. In addition, the catalyst metal may include other metal species, e.g., an alkali metal, alkaline-earth metal, or transition metal. The use is preferred among the preceding of rhodium, which has a high reducing activity, and palladium and platinum, which have high oxidizing activities, while the use of two or more of the preceding in combination is particularly preferred. This supports an efficient purification of the various harmful components present in exhaust gas. Moreover, the alloying of two or more catalyst metals under high-temperature conditions is strongly suppressed with the art disclosed herein. The performance of the catalyst metal can be thoroughly developed as a result.

From the perspective of increasing the area of contact with the exhaust gas, this catalyst metal is preferably used in a form of microfine particles having sufficiently small particle diameters. An average particle diameter $D_{50}$ of the catalyst metal particles (here and below, a number-based average value of the particle diameter as determined by observation with a transmission electron microscope (TEM)) is generally smaller than the pore diameter $P_{10}$ and is about 1 to 15 nm and is preferably typically not more than 10 nm, for example, not more than 7 nm or not more than 5 nm. The pore diameter $P_{10}$ being larger than the average particle diameter $D_{50}$ indicates that many pores capable of incorporating the catalyst metal are present. Such a configuration is effective for bringing about a highly dispersed loading of the catalyst metal on the support. Thus, the effects of the present invention can be expressed at even higher levels by adjusting the pore diameter of the support in conformity to the size of the catalyst metal.

In a preferred embodiment, the ratio of the average pore diameter $P_{50}$ to the average particle diameter $D_{50}$ ($P_{50}/D_{50}$) is larger than approximately 1 and is typically at least 2 and preferably at least 5, for example, at least 7, and is not more than approximately 40 and is typically not more than 30 and preferably not more than 25 and more preferably not more than 20, for example, not more than 1.5.

In a preferred embodiment, the ratio of the pore diameter $P_{90}$ to the average particle diameter $D_{50}$ ($P_{90}/D_{50}$) is not more than approximately 50 and is preferably not more than 40, for example, not more than 34.

The catalyst metal can be loaded in a satisfactorily highly dispersed state when these ratios are at least the prescribed values. The sintering accompanying catalyst metal particle growth can be advantageously suppressed when these ratios are not more than the prescribed values. The effects of the present invention can then be expressed at even higher levels.

A plurality of metal species are used in combination as the catalyst metal in a preferred embodiment. With this embodiment, the configuration of the catalyst metal can be adjusted as appropriate to accommodate, for example, the operating conditions of the internal combustion engine. Specifically, a plurality of metal species may be disposed so as to be present mixed over the catalyst layer as a whole; or, using for the catalyst layer an upper-and-lower two-layer structure considered in the thickness direction, one metal species (for example, Rh) may be present in the upper layer and another metal species (for example, Pd and/or Pt) may be present in the lower layer. Or, for example, considered along the cylinder direction of the substrate (the direction of exhaust gas flow), one metal species may be incorporated on the upstream side and another metal species may be incorporated on the downstream side. By loading a plurality of metal species with separation into the individual metal species, a further inhibition can be obtained of the decline in catalytic activity caused by the alloying of a plurality of metals (for example, Rh alloying with Pt and/or Pd).

In an embodiment in which a plurality of metal species are used in combination, preferably there are no extreme differences between or among the contents of the individual metal species. For example, in an embodiment in which two metal species are used in combination, a content ratio between a first metal species and a second metal species should be about 5:1 to 2:1 and is preferably 3:1 to 2:1. According to investigations by the present inventors, sintering tends to be more readily produced in embodiments in which there is an extreme difference between the use amounts of the two metal species. By observing the indicated range, the purification capacity of the catalyst can be fully expressed and the effects of the present invention are then fully obtained.

A content (loaded amount) of the catalyst metal is not particularly limited because it can vary as a function of, far example, the amount of exhaust gas and/or the application; however, it should be at least about 0.1 mass % and typically at least 0.2 mass %, for example, at least 0.3 mass % and preferably at least 0.4 mass %, and not more than about 3 mass % and typically not more than 2 mass %, for example, not more than 1 mass % of the total mass of the catalyst layer. When the catalyst metal content is too small, it becomes difficult to obtain the desired exhaust gas purification performance and the emission of harmful components can then occur. When, on the other hand, the catalyst metal content is too large, alloying and particle growth by the catalyst metal particles progress and the desired catalytic activity may then not be obtained in a stable manner. It is also disadvantageous from a cost standpoint. The observance of the range indicated above makes it possible for the effects of the present invention to be exhibited at high levels.

<<Method of Producing the Exhaust Gas Purification Catalyst>>

Aside from the use as the support of the ceramic powder that satisfies the previously described pore diameter distribution, the exhaust gas purification catalyst disclosed herein can be produced by the same methods as heretofore. The following methods are examples of the formation of the catalyst layer: washcoating the substrate surface with a slurry containing a powder of the support (the ceramic powder) followed by loading the catalyst metal on the support by, for example, a heretofore known impregnation loading method; preloading the catalyst metal on the support particles constituting a support powder and washcoating the substrate surface with a slurry containing this catalyst metal-containing support powder.

In a preferred embodiment, for example, a washcoat layer-forming slurry is first prepared using a binder (for example, alumina sol, silica sol) and the ceramic powder as the support powder. When this is done, the binder should be incorporated so as to provide approximately 1 to 10 g/L-cat., for example, 5 to 8 g/L-cat. The incorporation of the binder in this amount makes it possible for the slurry to suitably adhere to the substrate surface. In addition to the support powder and binder, other optional components may be added to the slurry as appropriate. A typical example of these additional components is a heretofore known oxygen storage capacity material (OSC material). The viscosity of the slurry should be adjusted to enable it to readily flow into the cells in the substrate (for example, a honeycomb substrate).

Then, a suitable substrate is prepared and the slurry is applied to (coated on) a prescribed range of the substrate (specifically the rib wall) by supplying the slurry prepared as described above from one end part of the substrate and applying suction from the other end part. The amount of slurry application (coated amount) is not particularly limited, but should be generally 70 to 500 g/L-cat., for example, about 100 to 200 g/L-cat. Particle growth by the loaded catalyst metal can be advantageously suppressed by using such a coated amount. The pressure loss during passage of the exhaust gas through the cell interior can also be kept low.

The substrate with the applied slurry is then dried at a prescribed temperature for a prescribed time and is heat treated (baked). The conditions for drying and baking the slurry washcoated on the surface of the substrate are not particularly limited because they can vary, for example, with the shape and size of the substrate or support, but a desired washcoat layer can generally be formed in a relatively short period of time by drying for about 1 to 10 hours at about 50° C. to 120° C. (for example, 60° C. to 100° C.) and then baking for about 2 to 4 hours at approximately 400° C. to 1000° C. (for example 400° C. to 600° C.).

The desired catalyst metal component (typically a solution containing the catalyst metal, e.g., Pd, Pt, Rh, and so forth, in ion form) is applied to the surface of the washcoat layer in order to impregnate and load the catalyst metal, and this is followed by again drying at a prescribed temperature for a prescribed time and carrying out a heat treatment. The drying and baking conditions, for example, can be the same as during formation of the washcoat layer as described above. The exhaust gas purification catalyst can be produced by proceeding in this manner.

<<Use of the Exhaust Gas Purification Catalyst>>

The exhaust gas purification catalyst disclosed herein provides a better suppression of catalyst metal particle growth and can exhibit an excellent exhaust gas purification performance. It can therefore be advantageously disposed in the exhaust system (exhaust pipe) of various internal combustion engines, for example, the diesel engines and gasoline engines of automobiles.

Several examples in relation to the present invention are described below, but this does not mean that the present invention is limited to these specific examples.

The exhaust gas purification catalyst of Example 1 is provided with a cylindrical honeycomb substrate and a catalyst layer having a monolayer structure disposed on this substrate. This exhaust gas purification catalyst was produced as follows.

First, using an Attritor (registered trademark), a commercially available alumina powder (average particle diameter=90 μm) was ground under the following conditions: grinding medium: water; rotation rate: 200 rpm; grinding time: 30 minutes. The resulting alumina powder had an average particle diameter of 5.5 μm, a pore diameter $P_{10}$ corresponding to the cumulative 10% from the small pore side of 10 nm, an average pore diameter $P_{50}$ of 25 nm, a pore diameter $P_{90}$ corresponding to the cumulative 90% from the small pore side of 34 nm, a pore diameter $P_{95}$ corresponding to a cumulative 95% from the small pore side of 40 nm, and a pore volume of 0.7 mL/g.

This alumina powder and aluminum nitrate (40 mass % aqueous solution) and alumina sol as binders were weighed out at a mass ratio of 100:25:6 and were dispersed in deionized water and a slurry was prepared using an Attritor (registered trademark). The amount of the binder here was a cumulative 6.57 g/L-cat.

The resulting slurry was then applied over the entire surface of the substrate (rib wall) by introducing it through one end surface of the substrate and applying suction from the other end surface. A cylindrical straight-flow honeycomb substrate (made of cordierite) with a volume (refers to the bulk volume of the whole article, also including the volume of the cell flow paths) of about 0.02 L was used as the substrate. The excess slurry was then drained from the substrate; the water was removed by drying for 2 hours at 70° C.; and the template was removed by heat treating at 500° C. This resulted in the formation of a washcoat layer at 120 g/L-cat.

The washcoat layer-bearing substrate was then impregnated with an aqueous nitric acid solution of dinitrodiamino-platinum in order to load 0.55 mass % of Pt thereon. Loading with 0.28 mass % of Pd was also performed by impregnation with an aqueous palladium nitrate solution. This was followed by baking for 1 hour at 500° C. to obtain an exhaust gas purification catalyst (Example 1) having a catalyst layer formed on the substrate. The average particle diameter $D_{50}$ of the catalyst metal particles according to TEM observation of a portion of the catalyst layer was 1 nm.

In Example 2, an exhaust gas purification catalyst (Example 2) was produced proceeding as in Example 1, but use a ceria powder (average particle diameter=5 μm, $P_{10}$=11 nm, $P_{50}$=25 nm, $P_{90}$=40 nm, $P_{95}$=45 nm, pore volume=0.5 mL/g) as the support.

In Example 3, an exhaust gas purification catalyst (Example 3) was produced proceeding as in Example 1, but bringing the amount of binder contained in the washcoat layer-forming slurry to 9.86 g/L-cat.

In Example 4, an exhaust gas purification catalyst (Example 4) was produced proceeding as in Example 1, but bringing the amount of the washcoat layer-forming slurry to 180 g/L-cat.

In Example 5, an exhaust gas purification catalyst (Example 5) was produced proceeding as in Example 1, but bringing the amount of Pt loaded to 0.28 mass % and bringing the amount of Pd loaded to 0.14 mass %.

In Example 6, an exhaust gas purification catalyst (Example 6) was produced proceeding as in Example 1, but bringing the amount of Pt loaded to 1.89 mass % and bringing the amount of Pd loaded to 0.94 mass %.

In Example 7, an exhaust gas purification catalyst (Example 7) was produced proceeding as in Example 1, but bringing the amount of Pt loaded to 2.36 mass % and bringing the amount of Pd loaded to 0.47 mass %.

In Example 8, an exhaust gas purification catalyst (Example 8) was produced proceeding as in Example 1, but using as the support an alumina powder that had different properties (i.e., average particle diameter=5 μm, $P_{10}$=8 nm, $P_{50}$=17 nm, $P_{90}$=54 nm, $P_{95}$=70 nm, pore volume=0.8 mL/g).

In Example 9, an exhaust gas purification catalyst (Example 9) was produced proceeding as in Example 1, but without using the binder.

In Example 10, an exhaust gas purification catalyst (Example 10) was produced proceeding as in Example 1, but bringing the amount of the washcoat layer-forming slurry to 60 g/L-cat.

In Example 11, an exhaust gas purification catalyst (Example 11) was produced proceeding as in Example 1, but bringing the amount of Pt loaded to 0.14 mass % and bringing the amount of Pd loaded to 0.07 mass %.

In Example 12, an exhaust gas purification catalyst (Example 12) was produced proceeding as in Example 1, but bringing the amount of Pt loaded to 2.83 mass % and not loading with Pd (impregnation with the aqueous palladium nitrate solution was not carried out).

In Example 13 an exhaust gas purification catalyst (Example 13) was produced proceeding as in Example 1, but bringing the amount of Pt loaded to 2.57 mass % and bringing the amount of Pd loaded to 0.26 mass %.

<<Purification Performance Evaluation 1>>

The exhaust gas purification catalysts (Example 1 to Example 13) obtained as described above were subjected to a durability treatment followed by evaluation of the 50% purification temperature. Specifically, the exhaust gas purification catalyst was first introduced into an electric furnace and a heat treatment was carried out for 50 hours at 600° C. in air. After the durability treatment, the exhaust gas purification catalyst was installed in a rig and, while raising the temperature at a ramp rate of 30° C./min, a simulated exhaust gas with the composition shown in Table 1 below was introduced, to provide an SV value of 75000l/h and the HC (here, propylene) concentration and the CO concentration were measured at the exit. The temperature was measured at which the HC concentration reached 50 mol % of that in the inflowing gas and at which the CO concentration reached 50 mol % of that in the inflowing gas.

TABLE 1

| gas designation | concentration |
| --- | --- |
| $C_3H_6$ | 1000 ppmC |
| CO | 200 ppm |
| NO | 200 ppm |
| $O_2$ | 10% |
| $CO_2$ | 5% |
| $H_2O$ | 10% |
| $SO_2$ | 2 ppm |
| $N_2$ | balance |

Test examples having different pore diameter distributions for the ceramic constituting the support are shown in Table 2 below. In Table 2, "HC_T50" gives the 50% purification temperature (° C.) for propylene and "CO_T50" gives the 50% purification temperature (° C.) for carbon monoxide. Lower 50% purification temperatures are indicative of a better purification performance.

TABLE 2

| | | support | | | | | | | | | purification performance | |
| --- | --- | --- | --- | --- | --- | --- | --- | --- | --- | --- | --- | --- |
| | type | $P_{10}$ (nm) | $P_{50}$ (nm) | $P_{90}$ (nm) | $P_{95}$ (nm) | $P_{10}/P_{90}$ | $P_{50}/D_{50}$ | pore volume (mL/g) | average particle diameter (μm) | specific surface area (m²/g) | HC T50 (° C.) | CO T50 (° C.) |
| Ex. 1 | alumina | 10 | 25 | 34 | 40 | 0.29 | 25 | 0.7 | 5.5 | 150 | 195 | 135 |
| Ex. 2 | ceria | 11 | 25 | 40 | 45 | 0.28 | 25 | 0.5 | 5 | 100 | 196 | 129 |
| Ex. 8 | alumina | 8 | 17 | 54 | 70 | 0.15 | 17 | 0.8 | 5 | 170 | 212 | 158 |

Example 1 and Example 8 will be compared first. Example 1 is an example in which the pore diameter $P_{10}$ and the pore diameter $P_{90}$ are both in the 5 to 50 nm range. Example 1 has a (sharper) pore diameter distribution in which the ratio $P_{10}/P_{90}$ is relatively closer to 1. In contrast to this, Example 8 is a comparative example in which the pore diameter $P_{90}$ is not in the 5 to 50 nm. Example 8 has a broader pore diameter distribution in which the ratio $P_{10}/P_{90}$ is relatively closer to 0.

As is clear from Table 2, Example 1 was able to realize a higher HC purification performance and a higher CO purification performance than iii Example 8. The reason for this is thought to be that the greater uniformity in the pore diameters in the support enabled a highly dispersed loading of the catalyst metal and an effective suppression of sintering of the catalyst metal.

In addition, Example 2 is a test example in which the type of ceramic was different from that in Example 1. As demonstrated by Example 2, about the same purification performance could be realized for the use of ceria as the ceramic of the support as for the use of alumina. This demonstrated that the previously described effect of improving the purification performance may be brought about when the support satisfies the prescribed pore diameter distribution regardless of the type of ceramic.

The catalyst metal is examined next. Table 3 below shows test examples having different catalyst metal contents and different content ratios for a plurality of metal species. The indication of the purification performance is the same as in Table 2.

TABLE 3

| | catalyst metal | | | purification performance | |
|---|---|---|---|---|---|
| | metal 1 (mass %) | metal 2 (mass %) | ratio of metal 1:metal 2 | total catalyst metal (mass %) | HC T50 (° C.) | CO T50 (° C.) |
| Example 1 | Pt(0.55) | Pd(0.28) | 2:1 | 0.83 | 195 | 135 |
| Example 5 | Pt(0.28) | Pd(0.14) | 2:1 | 0.42 | 199 | 148 |
| Example 6 | Pt(1.89) | Pd(0.94) | 2:1 | 2.83 | 188 | 128 |
| Example 7 | Pt(2.36) | Pd(0.47) | 5:1 | 2.83 | 186 | 124 |
| Example 11 | Pt(0.14) | Pd(0.07) | 2:1 | 0.21 | 258 | 192 |
| Example 12 | Pt(2.83) | — | — | 2.83 | 207 | 154 |
| Example 13 | Pt(2.57) | Pd(0.26) | 10:1 | 2.83 | 203 | 153 |

Example 1, Example 5, Example 6, and Example 11, which have different catalyst metal contents, will be compared first.

As is clear from Table 3, the 50% purification temperature for HC could be brought to less than 200° C. and the 50% purification temperature for CO could be brought to less than 150° C. in these test examples by having the total amount of catalyst metal be at least 0.4 mass % (particularly at least 0.42 mass %). It was thus shown that, from the standpoint of realizing an excellent HC purification performance and an excellent CO purification performance, the total amount of catalyst metal is preferably made at least 0.4 mass %. Viewed from the perspective of energy savings and low cost, on the other hand, the amount of catalyst metal is preferably reduced. A somewhat flattened trend for the improvement in purification performance is seen from a comparison of Example 1 with Example 6. Accordingly, it was demonstrated that the total catalyst metal should be not more than 3 mass % (particularly not more than 2.83 mass %) from the standpoint of balancing the purification performance with cost.

Example 6, Example 7, Example 12, and Example 13, which have different content ratios for the metal species, are compared next.

As is clear from Table 3, additional improvements in the purification performance could be obtained in these test examples by using a combination of a plurality of metal species as the catalyst metal. Moreover, when a plurality of metal species were used in combination, it can be concluded that extreme differences in the use amounts of the individual metal species are preferably not present. For example, the content ratio between Pt and Pd is preferably about 5:1 to 2:1 and is more preferably 3:1 to 2:1.

The conditions during washcoating will be examined next. Table 4 below shows test examples that had different coated amounts and different binder contents in the washcoat layer-forming slurry. The indication of the purification performance is the same as in Table 2.

TABLE 4

| | amount of binder (g/L-cat.) | coated amount (g/L-cat.) | purification performance | |
|---|---|---|---|---|
| | | | HC T50 (° C.) | CO T50 (° C.) |
| Example 1 | 6.57 | 120 | 195 | 135 |
| Example 3 | 9.86 | 120 | 195 | 131 |
| Example 4 | 6.57 | 180 | 196 | 133 |
| Example 9 | — | 120 | 230 | 152 |
| Example 10 | 6.57 | 60 | 211 | 159 |

It can be concluded from a comparison of Example 1, Example 3, and Example 9 among these test examples that the binder is preferably contained in the washcoat layer-forming, slurry in a proportion of, for example, 6 to 10 g/L-cat.

It can also be concluded from a comparison of Example 1, Example 4, and Example 10 among these test examples that the coated amount for the washcoat layer (the amount of slurry applied) is preferably 100 to 200 g/L-cat. (particularly 120 to 180 g/L-cat.), <<Purification Performance Evaluation 2>>

Figure 2:
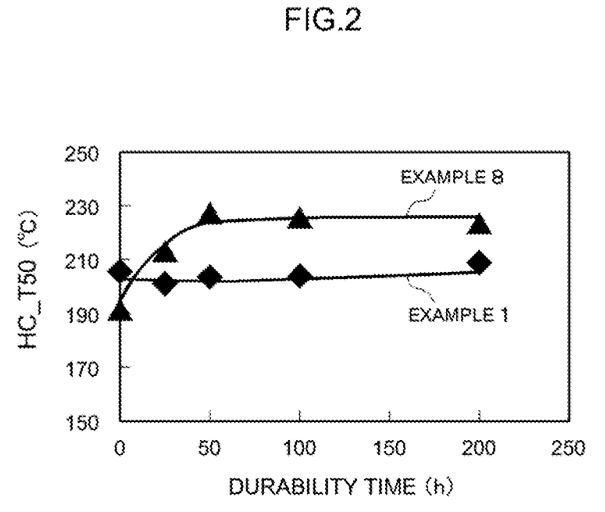
FIG. 2 is a graph that compares the catalytic activities (HC oxidation activity) of the exhaust gas purification catalysts according to Example 1 and Example 8.
Figure 3:
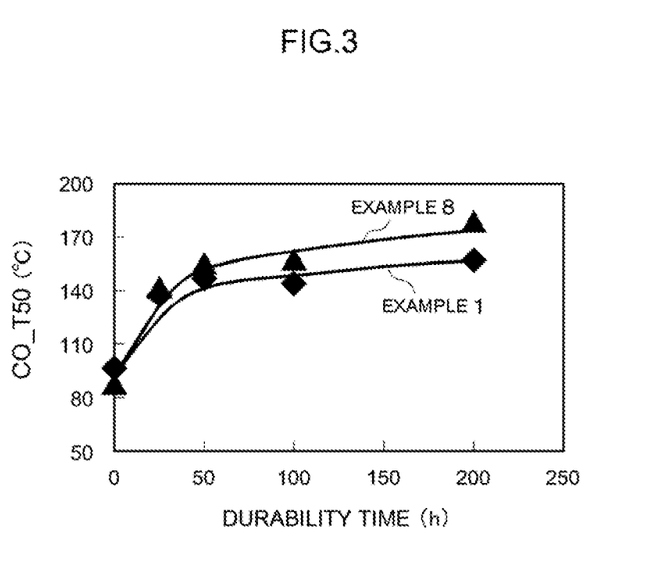
FIG. 3 is a graph that compares the catalytic activities (CO oxidation activity) of the exhaust gas purification catalysts according to Example 1 and Example 8.

The durability was evaluated using separately produced exhaust gas purification catalysts (Example 1 and Example 8). Specifically, the exhaust gas purification catalyst was first introduced into a rig and, while raising the temperature at a ramp rate of 40° C./min, the simulated exhaust gas with the composition shown in Table 5 below for fast idle after engine start was introduced to provide an SV value of 60000/h and HC_T50 and CO_T50 were measured as in evaluation 1 above. The exhaust gas purification catalyst was then introduced into an electric furnace and a durability treatment (heat treatment for 25 hours at 600° C. in air) was performed followed by reintroduction into the rig and measurement of HC_T50 and CO_T50 under the same conditions. The measurements were carried out in the same manner on exhaust gas purification catalysts that had been subjected to a durability treatment for 50 hours, 100 hours, or 200 hours in order to evaluate the durability of the exhaust gas purification catalyst. The results are given in FIG. 2 and FIG. 3. FIG. 2 is a graph that compares the HC oxidation activity. FIG. 3 is a graph that compares the CO oxidation activity.

TABLE 5

| gas designation | concentration |
|---|---|
| $C_3H_6$ | 8000 ppmC |
| CO | 1000 ppm |
| NO | 200 ppm |
| $O_2$ | 10% |
| $CO_2$ | 5% |
| $H_2O$ | 10% |
| $N_2$ | balance |

As shown in FIG. 2 and FIG. 3, Example 1 according to the present invention had a better durability than did Example 8, which is a conventional product. That is, as shown in FIG. 2 in accordance with the art disclosed herein, the HC purification performance of the catalyst metal could be expressed in a stable manner on a long-term basis and a relatively longer life could be realized. In addition, as shown in FIG. 3, in accordance with the art disclosed herein, the decline in the CO purification performance of the catalyst metal could be better suppressed in comparison to the conventional product. These results show the technical significance of the present invention.

Specific examples of the present invention are described in detail above, but these are nothing more than examples and do not limit the claims. Various modifications and alterations of the specific examples provided above as examples are encompassed by the art described in the claims.

REFERENCE SIGNS LIST

1 Substrate
2 Through hole (cell)
4 Partition (rib wall)
10 Exhaust gas purification catalyst

The invention claimed is:
1. An exhaust gas purification catalyst that is disposed in an exhaust pipe of an internal combustion engine and that performs purification of an exhaust gas discharged from the internal combustion engine, the exhaust gas purification catalyst comprising a substrate and a catalyst layer formed on the substrate, wherein
the catalyst layer comprises a catalyst metal that functions as an oxidation and/or reduction catalyst and a support that supports the catalyst metal, wherein
a number-based average particle diameter that is based on electron microscopic observation of said catalyst metal is between 1 nanometer and 5 nanometers, wherein
the support is constituted of a porous ceramic for which, in volumetric pore diameter distribution thereof measured based on a nitrogen gas adsorption method, there exists a first pore diameter and a second pore diameter, wherein
ten percent of all pores have a diameter that is smaller than said first pore diameter, wherein ninety percent of all pores have a diameter that is smaller than said second pore diameter, wherein the first pore diameter is between five and fifty nanometers, and wherein the second pore diameter is between twenty and fifty nanometers, wherein
there exists an average pore diameter, wherein half of all pores have a diameter that is smaller than said average pore diameter, wherein there exists a ratio formed by dividing said average pore diameter by the number-based average particle diameter, and wherein said ratio is between five and thirty inclusive.

2. The exhaust gas purification catalyst according to claim 1, wherein there exists a ratio between the first pore diameter and the second pore diameter, and wherein said ratio is between 0.35 and 0.6 inclusive.

3. The exhaust gas purification catalyst according to claim 1, wherein the porous ceramic has a total pore volume, and wherein no more than five percent of said total pore volume is within pores that have a diameter that is greater than one-hundred nanometers.

4. The exhaust gas purification catalyst according to claim 1, wherein the first pore diameter is between five nanometers and twenty nanometers.

5. The exhaust gas purification catalyst according to claim 1, wherein the total pore volume of the porous ceramic is at least 0.2 mL/g.

6. The exhaust gas purification catalyst according to claim 1, wherein a proportion of the catalyst metal is 0.3 to 1 mass % with reference to a total mass of the catalyst layer.

7. The exhaust gas purification catalyst according to claim 1, wherein said average pore diameter is at least twenty nanometers.

* * * * *